UNITED STATES PATENT OFFICE.

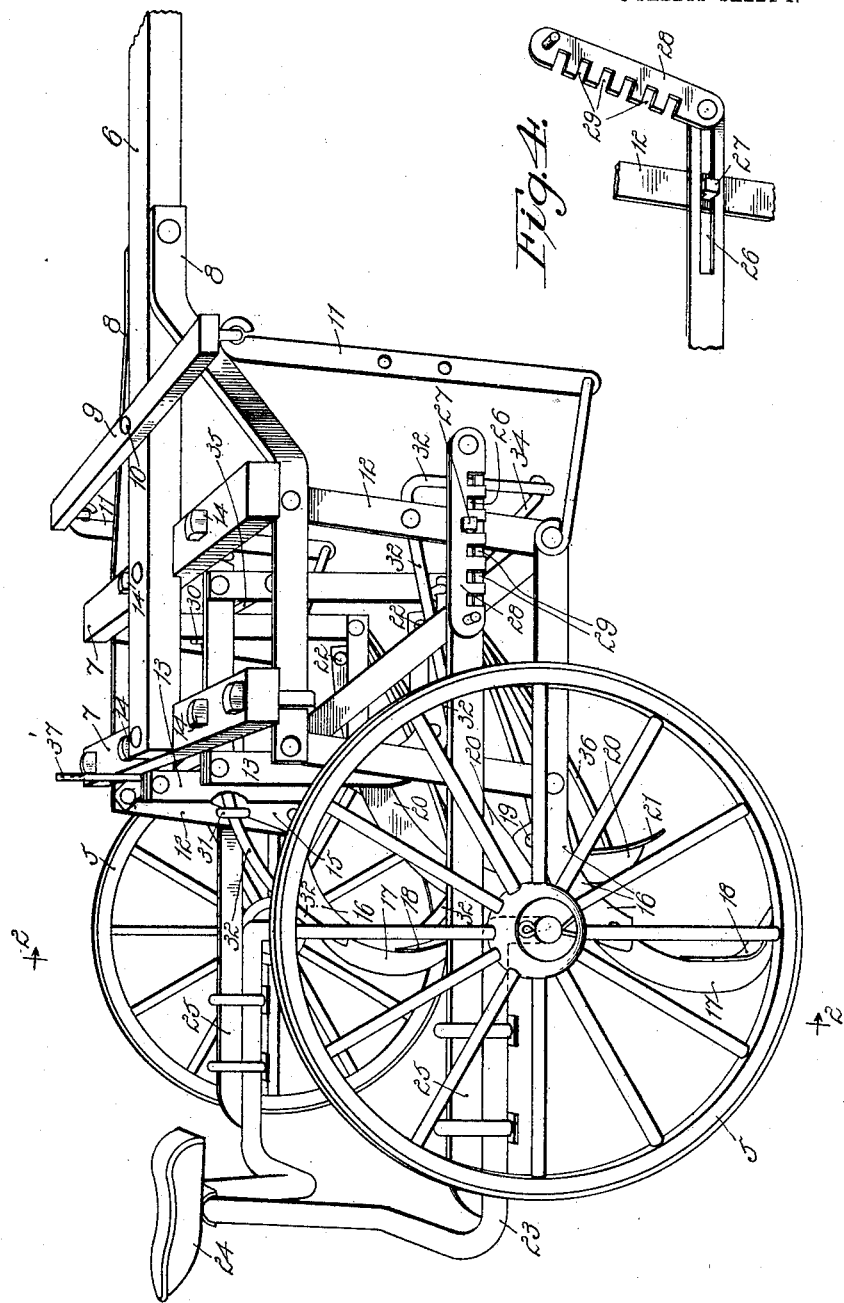

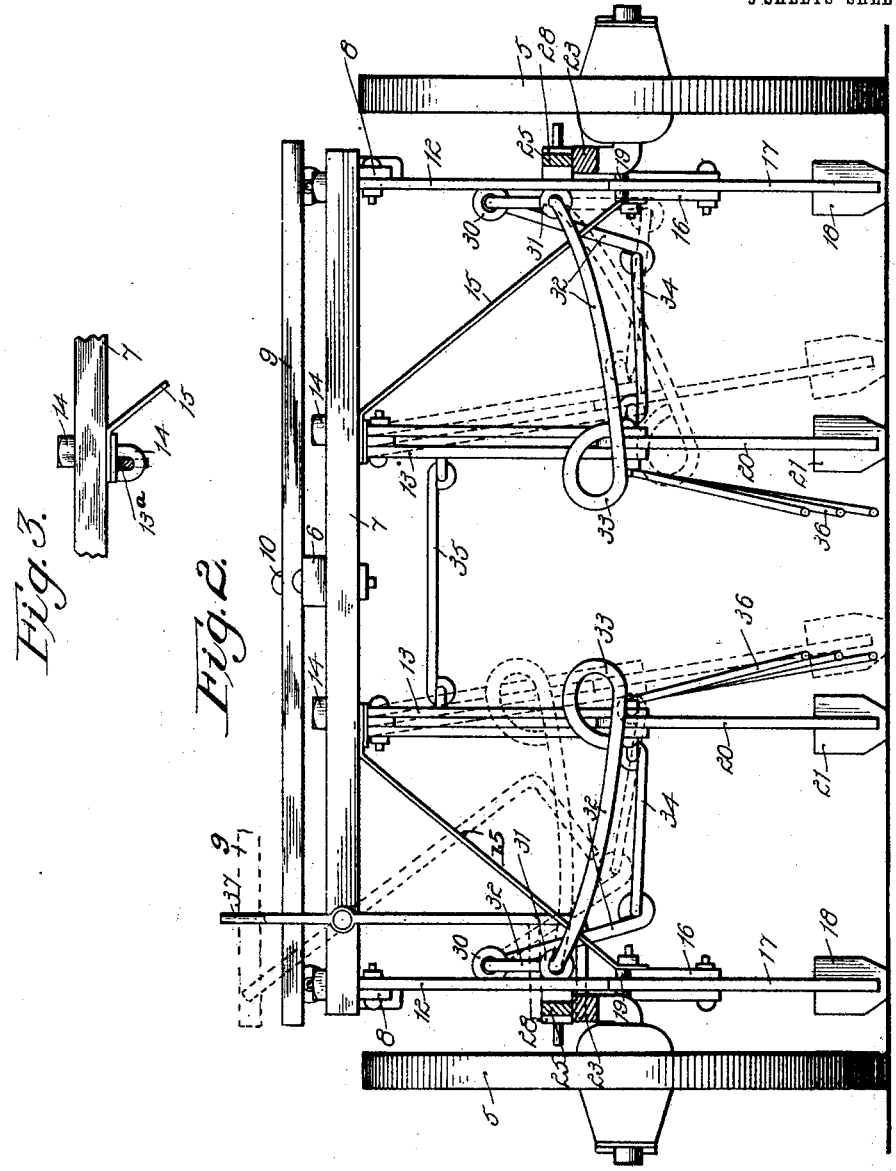

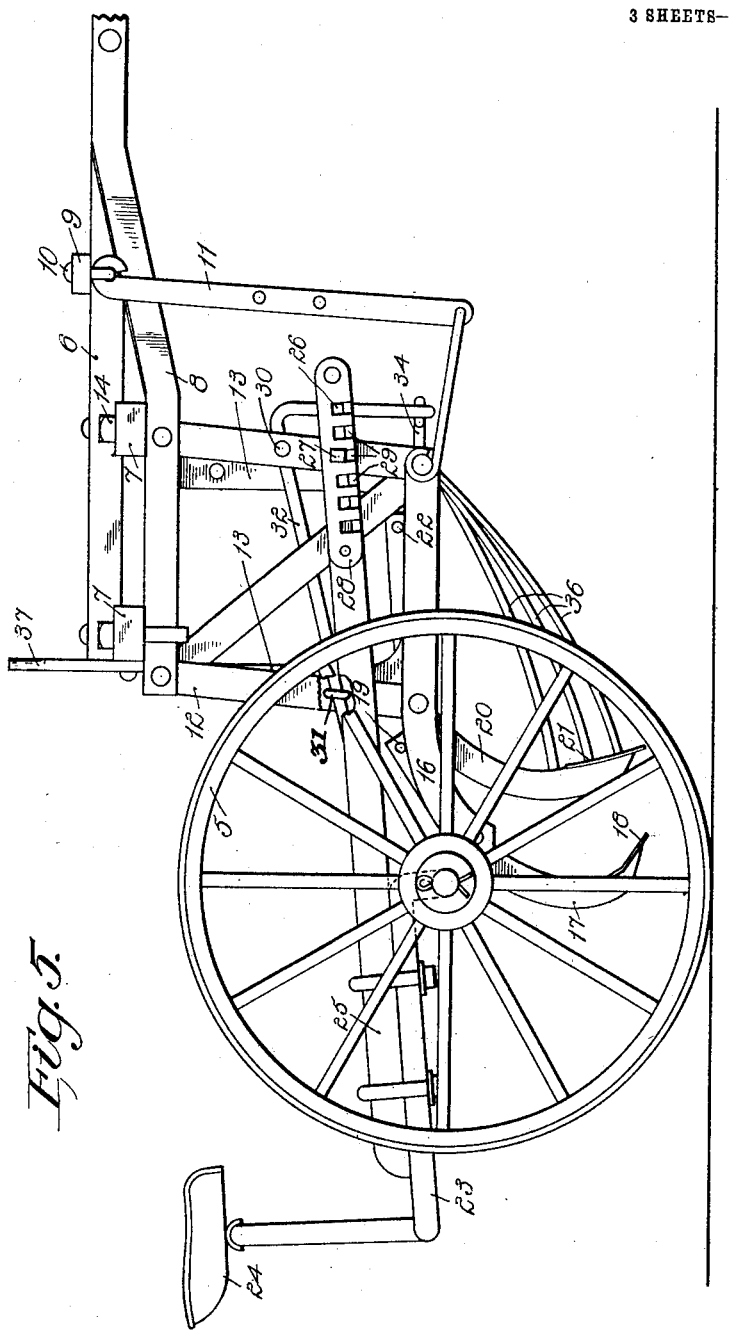

JOHN A. HORNBECK, OF HINSDALE, ILLINOIS.

CULTIVATOR.

1,107,071. Specification of Letters Patent. Patented Aug. 11, 1914.

Application filed April 12, 1913. Serial No. 760,770.

*To all whom it may concern:*

Be it known that I, JOHN A. HORNBECK, a citizen of the United States, residing at Hinsdale, in the county of Dupage and State of Illinois, have invented a certain new and useful Improvement in Cultivators, of which the following is a full, clear, concise, and exact description, reference being had to the accompanying drawings, forming a part of this specification.

My invention relates to cultivators, and its object is to provide a simple, economical and efficient machine. The plow-carrying parts of the cultivator of my invention are adapted to be counterbalanced by the weight of the operator, and I provide manually operated means for shifting some of the plows laterally, as desired.

I am aware that the broad idea of counterbalancing the plow-carrying parts by means of the weight of the operator is old, so I therefore do not claim counterbalancing of the plow-carrying parts broadly. I have, however, so constructed my cultivator that the counterbalancing of the plow-carrying parts is secured without the provision of complicated lever arrangements, etc. The operator of the cultivator of my invention is enabled to bring the plows into engagement with the ground by merely throwing some of his weight upon a pair of stirrups in which his feet are intended to rest when he is seated upon the machine. Throwing a portion of his weight upon the stirrups reduces the weight carried by the rear portion of the cultivator and the plow-carrying parts are lowered to the ground. When the operator wishes to lift the plows from engagement with the ground he merely permits his entire weight to be carried by the seat. When the entire weight of the operator, or most of it, is carried by the seat, the plow-carrying parts are lifted and so remain until the operator again throws a portion of his weight upon the stirrups. Means is provided for readily adjusting the machine to the weight of the operator.

The cultivator here shown comprises a main framework and a plurality of subframes carried thereby, said subframes being arranged in parallel relation transversely of the machine. Each of these subframes, as shown, supports one plow, although any number of plows desired may be supported by each of the subframes. The two inner subframes are pivotally connected to the main frame in order that they may be shifted laterally upon their pivots. I provide a pair of stirrups, each of which is so connected with its adjacent pivoted subframe that depressing either one of the stirrups moves its adjacent pivoted subframe laterally. The pivoted subframes are connected by means of a suitable link in order that they may be shifted laterally simultaneously. It will be readily seen, therefore, that the pivoted subframes may be readily shifted laterally in either direction by selectively depressing their associated stirrups, and that no lateral shifting of the pivoted subframes and plows carried thereby takes place if equal forces are exerted upon both stirrups at the same time. These and other features of the cultivator of my invention are set forth in more detail in the following description and are illustrated in the accompanying drawings in which:

Figure 1 is a perspective view of the cultivator of my invention, Fig. 2 is a rear view thereof, taken on the line 2—2 Fig. 1, Fig. 3 is a detailed sectional view illustrating how the pivoted subframes are connected to the main frame, Fig. 4 is an isolated perspective view illustrating how the cultivator is adjusted to the weight of the operator, and Fig. 5 is a side elevational view of the cultivator with the plows in raised position.

Similar reference numerals refer to similar parts throughout the several views.

As shown, the cultivator of my invention comprises suitable wheels, indicated at 5.

At 6 I have shown the usual tongue which is bolted to a pair of transverse bars 7. Bolted to the tongue 6 are the bent side bars 8, which are also attached to the transverse bars 7. A bar 9 pivoted to the tongue at 10 has descending from either end thereof a bar 11, which has its lower end connected by means of a suitable link to one of the end subframes of the cultivator. Each of the bars 11 is provided with suitable apertures by means of which connection may be made to the ordinary whiffletrees in the usual manner.

Arranged under the transverse bars 7 are a plurality of subframes. The outer subframes indicated at 12 are rigidly secured to the side bars 8 which in turn are secured to the transverse bars 7. Each of the inner subframes indicated at 13 comprises vertical front and rear bars and a horizontal connecting bar 13$^a$. The connection between the subframes 13 and the transverse bars is a very simple one, the horizontal connecting bar 13$^a$ of each of the subframes 13 passing through a U-shaped member 14 with which each of the bars 7 is provided. In Fig. 3 I have illustrated how the top bar of one of the subframes 13 passes through a U-shaped member carried by one of the bars 7. Suitable brace rods 15 may extend from the lower ends of the subframes 12 to the bars 7 as shown.

Each of the subframes 12 is provided with a rearwardly projecting beam 16 in which is pivoted the shank 17 of a plow 18. Each of the shanks 17 at its upper end is provided with an aperture through which is inserted a wooden break-pin 19. The wooden pins 19 retain their associated plows in operative position under normal conditions, but are designed to yield in case the plows strike an obstruction such as a rock or a stump. Pivoted in the middle subframes 13 are the shanks 20 of suitable plows 21. Suitable break-pins 22 are provided for retaining the shanks 20 in the position shown in the drawings. It will be noted that the wooden plugs which are employed are located above the pivotal points of the shanks and are above any obstruction which the plows might strike.

Forming axles for the wheels 5 is a bent bar 23, which also serves to carry a seat 24, as shown. Secured to the bar 23 are the horizontal side members 25, each of which is secured to its adjacent rigidly-secured subframe 12, as shown. The connections between the side bars 25 and the adjacent subframes are adjustable, the adjustable securing means comprising slots 26 in the bars 25 and tongues 27 carried by the subframes 12, which ride in said slots. Pivoted to the forward end of each of the bars 25 is a plate 28 provided with a plurality of notches 29 adapted to engage its tongue 27. It will thus be seen that the tongues 27 may be retained in any position along their slots 26 and so determine the position of the subframes relatively to the axles of the wheels.

The machine illustrated in the drawings is adjusted for an operator whose weight is slightly above the average. The machine can, however, be readily adjusted for a lighter operator by moving the subframes and parts secured thereto toward the axles and retaining the tongues 27 at the necessary points within their respective slots 26.

From the above description it will be seen that the bar 23 and the side bars 25 constitute a lever having the wheels 5 as a fulcrum, the seat 24 being mounted upon one arm of the lever and the plows and plow-carrying parts being mounted upon the other end of the lever and pivoted on the tongues 27. The adjustment of the parts is such that when the operator is seated upon the cultivator his weight tends to raise the plows from the ground. The adjustable connections between the bars 25 and the subframes 12 are provided in order that, while the operator's weight is enough to raise the plows from the ground, when the operator is seated, the parts can be so adjusted that a very slight reduction in the force exerted upon the seat or an increase in the force exerted upon the forward ends of the bars 25 is sufficient to return the plows to the ground.

Each of the subframes 12 is provided with a pair of eyes 30 and 31 which support a bent bar 32. Each of the bent bars 32 is provided with a stirrup 33 which is so disposed that it is readily accessible to the operator. The forward ends of the bent bars 32 are connected by means of links 34 with their adjacent pivoted subframes 13. The pivoted subframes 13 are connected together by means of a suitable link 35, as shown.

From the description of the connection between the stirrup-carrying bars 32 and the pivoted subframes 13 it will readily be seen that the plows 20 carried by the pivoted subframes 13 may be shifted laterally in either direction by selectively depressing the stirrups 33. Suitable fenders 36 may be provided for keeping the stalks of the row between the plows 20 out of engagement with said plows. If desired, a locking lever 37 may be provided for retaining the plows in raised position, this lever comprising a lower portion at right angles to the rest of the lever, said lower portion being arranged to rest upon the top of the bars 25 to retain the plows and associated parts in raised position. In Fig. 2 I have illustrated the position assumed by the locking lever 37 when the plows are in lowered position. When the plows are in lowered position, the lower portion of the said lever is disposed under the bar 28 as shown. When the forward end of the cultivator is to be raised to the position indicated in full lines in Fig. 5 and in dotted lines in Fig. 2, the lever 37 is moved from its vertical position to the position indicated in dotted lines. After the subframes and plows have assumed the position shown in Fig. 5, the lever is moved or allowed to swing to a vertical position with the lower portion thereof disposed above the bar 28, whereupon the subframes and plows are held in raised position. I wish it to be understood that I do not consider the lever 37 an essential part of the device of my invention, as in many constructions embodying my invention it may be desirable to dispense with said lever.

The operation of my improved cultivator is as follows: When the operator takes his position in the seat 24, the plows are lifted from the ground, provided the locking lever is in non-locking position, and the cultivator may be taken to any suitable point without bringing the plows into play. When the plows are to be used the operator, who has placed his feet in the stirrups 33, presses downwardly upon the stirrups, forming parts of the rods 32 which engage the framework at points in front of the axle, whereupon the force exerted upon the forward arm of the lever comprising the bars 23 and 25 is greater than the force exerted upon the rear arm of said lever, and the forward arm moves downward, thus bringing the plows into engagement with the ground and into operative position. The mechanism for securing the side-shifting of the plows 20 has been explained in such detail that it will be unnecessary to go further into the operation of the devices whereby the shifting is secured. It will be seen, therefore, that the operator has complete control over the plows without operating any levers or other operating devices other than the stirrups in which his feet normally rest. The stirrups 33 may be said to control both the lateral and vertical movement of the plows 20, vertical motion of the plows being secured by conjoint downward pressure on the stirrups, and lateral movement of the plows being secured by a differential pressure upon said stirrups.

While I have illustrated my invention in a particular embodiment herein shown, I do not wish to be limited to the particular construction here shown, but desire to claim broadly any modifications embodying my invention which may suggest themselves to those skilled in the art.

What I claim and desire to secure by Letters Patent of the United States is:

1. A cultivator comprising wheels, a framework, a plurality of laterally and vertically shiftable plows supported by the framework, and a single pair of foot levers each connected with all of the laterally shiftable plows for controlling the adjustment of said plows both vertically and laterally.

2. In a cultivator comprising wheels, a framework carrying a seat and a plurality of plows, said framework constituting a lever having the wheels for a fulcrum, with the seat on one lever arm and the plows on the other arm, some of said plows being shiftable laterally and some of the plows being fixed relatively to the framework, and stirrups whereby the operator may control the vertical adjustment of all of the plows and the lateral adjustment of some of the plows.

3. In a cultivator comprising wheels, a bar forming axles for said wheels and bent back to form a seat support, a pair of parallel side bars bolted to said bent bar and extending forward from the axles, a plurality of plows supported by the forward ends of said side bars, said side bars and bent bar constituting a lever with the wheels as a fulcrum, with the seat on one lever arm and the plows on the other.

4. In a cultivator comprising wheels, a bar forming axles for said wheels and bent back to form a seat support, a pair of parallel side bars bolted to said bent bar and extending forward from the axles, a plurality of plows supported by the forward ends of said side bars, said side bars and bent bar constituting a lever with the wheels as a fulcrum, with the seat on one lever arm and the plows on the other, and means for adjusting the plows relative to the side bars.

5. In a cultivator comprising wheels, a bar forming axles for said wheels and bent back to form a seat support, a pair of parallel side bars bolted to said bent bar and extending forward from the axles, a plurality of plows supported by the forward end of said side bars, said side bars and bent bar constituting a lever with the wheels as a fulcrum, with the seat on one lever arm and the plows on the other, and means for adjusting the plows relative to the side bars, said last-mentioned means comprising pins riding in slots in said side bars and notched plates carried by the side bars for retaining the pins at the desired positions in said slots.

6. A cultivator comprising wheels, a framework consisting of a pair of side members constituting a lever having the wheels as a fulcrum, a seat supported by the rear ends of the side members, a plurality of subframes arranged transversely of the machine, plows supported by the subframes, a transverse support with which all of the subframes are carried, and a tongue attached to said supporting bar, there being one of said subframes pivoted to the forward end of each of said side members so that the subframes, plows and transverse support are raised bodily when the weight of the operator is carried entirely by the seat.

7. In a cultivator comprising wheels, a framework comprising a pair of bars constituting a lever having the wheels as a fulcrum, a seat supported by the rear ends of the side members, a transverse support, a plurality of subframes suspended from said transverse support, plows supported by said subframes, there being one of said subframes pivoted to the forward end of each of said side members, said subframes, transverse bar and plows being lifted bodily when the weight of the operator is carried entirely by the seat.

8. In a cultivator comprising wheels, a framework comprising a pair of bars constituting a lever having the wheels as a fulcrum, a seat supported by the rear ends of the side members, a transverse support, a plurality of sub-frames suspended from said transverse support, plows supported by said subframes, two of said subframes being immovable relatively to the transverse support, a pair of subframes disposed between the first two subframes and pivotally suspended from the transverse support, each of said first two subframes being pivotally secured to the forward end of one of said side members, and stirrups whereby the operator when seated may control the vertical adjustment of all of the subframes and the lateral adjustment of the pivoted subframes.

9. In a cultivator comprising wheels, a framework comprising a pair of bars constituting a lever having the wheels as a fulcrum, a seat supported by the rear ends of the said bars, a transverse support, a plurality of subframes suspended from said transverse support, plows supported by said subframes, two of said subframes being immovable relative to the transverse support, a pair of subframes disposed between said first two subframes and pivotally suspended from the transverse support, each of said first two subframes being pivotally secured to the forward end of one of said first bars, and a foot lever pivoted to each of the first two subframes and connected with one of the pivoted subframes whereby the operator when seated may control the vertical adjustment of all of the subframes and the lateral adjustment of the pivoted subframes.

10. A cultivator comprising wheels, a frame constituting a lever having the wheels as a fulcrum, a seat carried by the rear end of said frame, a transverse support carried by the forward end of said frame, a plurality of plows suspended from said transverse support, some of said plows being fixed relatively to said support and some of said plows being pivotally suspended therefrom, together with foot levers whereby the operator when seated may control the vertical adjustment of all of the plows and the lateral adjustment of the pivotally suspended plows.

11. A cultivator comprising wheels, a frame constituting a lever having the wheels as a fulcrum, a seat carried by the rear end of said frame, a transverse support carried by the forward end of said frame, a plurality of plows suspended from said transverse support, some of said plows being fixed relatively to said support and some of said plows being pivotally suspended therefrom, together with foot levers whereby the operator when seated may control the vertical adjustment of all of the plows and the lateral adjustment of the pivotally suspended plows, and connecting means whereby the operator by actuating either one of said foot levers moves said plows simultaneously in the same direction.

12. A cultivator comprising wheels, a frame constituting a lever having the wheels as a fulcrum, a seat carried by the rear end of said frame and a transverse support carried by the front end of said frame, a plurality of plows suspended from said transverse support, and a pair of foot levers whereby the operator may control both the vertical adjustment and the lateral adjustment of said plows by downward pressure on said foot levers.

13. A cultivator comprising wheels, a frame constituting a lever having the wheels as a fulcrum, a seat carried by the rear end of said frame and a transverse support carried by the front end of said frame, a plurality of plows suspended from said transverse support, and a pair of foot levers whereby the operator may control the vertical adjustment of the plows by downward pressure upon the foot levers and the lateral adjustment of the plows by exerting downward pressure upon one of the foot levers.

14. A cultivator comprising wheels, a frame comprising a pair of side bars, said frame constituting a lever having the wheels as its fulcrum, a seat carried by the rear end of said frame and a plurality of connected plow carriers supported by the forward ends of said side bars, there being an elongated slot in the forward end of each of said bars, a tongue carried by the adjacent plow carrier projecting into each slot, and a notched plate hinged to each of said bars arranged to retain the tongues at any desired positions within the slots to adjust the cultivator for use by operators of different weights.

15. In a cultivator, a plurality of beams, plows attached to said beams, a suspension for each beam allowing lateral and vertical motion, manually controlled means connected to said beams, said manually controlled means operated conjointly to impart a vertical motion to said plows and operated differentially to impart a lateral movement to said plows.

16. In a cultivator, a frame, a plurality of plows suspended for vertical and lateral movement from said frame, and manually operated means for shifting the plows to various positions vertically and laterally by the degree of pressure exerted thereon.

17. In a cultivator, beams, plows attached to said beams, supports for said beams allowing vertical and lateral movement of said plows, a pair of movable manual levers, each connected to said beams, said manual levers movable by pressure to control the vertical and lateral movement of said plows.

In witness whereof, I hereunto subscribe my name this 9th day of April, A. D. 1913.

JOHN A. HORNBECK.

Witnesses:
ALBERT C. BELL,
A. D. McCOBB.

Copies of this patent may be obtained for five cents each, by addressing the "Commissioner of Patents, Washington, D. C."